United States Patent
Derby et al.

(10) Patent No.: US 6,394,740 B1
(45) Date of Patent: May 28, 2002

(54) MATERIAL HANDLING DEVICE

(75) Inventors: Stephen J. Derby, Troy, NY (US); Bill R. Lyons, Bennington, VT (US)

(73) Assignee: Distributed Robotics LLC, Troy, NY (US)

( * ) Notice: Subject to any disclaimer, the term of this patent is extended or adjusted under 35 U.S.C. 154(b) by 0 days.

(21) Appl. No.: 09/587,334

(22) Filed: Jun. 5, 2000

Related U.S. Application Data

(60) Provisional application No. 60/137,539, filed on Jun. 4, 1999.

(51) Int. Cl.[7] .............................................. B65G 57/24
(52) U.S. Cl. ................. 414/744.1; 414/802; 414/744.2; 414/744.5; 414/744.6; 901/15
(58) Field of Search ........................... 414/744.6, 744.2, 414/917, 802, 744.1, 744.3, 744.4, 744.5; 901/15

(56) References Cited

U.S. PATENT DOCUMENTS

| | | |
|---|---|---|
| 970,366 A | 9/1910 | Barber |
| 1,305,501 A | 6/1919 | Steele |
| 1,898,037 A | 2/1933 | Dietz |
| 1,959,512 A | 5/1934 | Wall |
| 1,965,745 A | 7/1934 | Luce et al. |
| 2,695,209 A | 11/1954 | De Wit et al. |
| 2,770,381 A | 11/1956 | Hegarty |
| 2,807,349 A | 9/1957 | Hauck et al. |
| 2,815,866 A | 12/1957 | Watter |
| 2,836,280 A | 5/1958 | Hallahan |
| 2,875,908 A | 3/1959 | Woodcock |
| 3,033,059 A | 5/1962 | Melton et al. |
| 3,076,561 A | 2/1963 | Rogers |
| 3,083,843 A | 4/1963 | Novak |
| 3,137,286 A | 6/1964 | Raynor |
| 3,302,369 A | 2/1967 | Vinciguerra |
| 3,732,991 A | 5/1973 | Von Gal, Jr. et al. ............ 214/6 |
| 3,756,107 A | 9/1973 | Pax et al. ...................... 83/165 |
| 3,776,393 A | 12/1973 | Bargstedt ........................ 214/1 |
| 3,818,769 A | 6/1974 | Tigner et al. ................... 74/55 |
| 3,857,496 A | 12/1974 | Gonzales ........................ 214/1 |
| 3,888,360 A | 6/1975 | Ando et al. ..................... 214/1 |
| 3,967,737 A | 7/1976 | Peralta et al. .................. 214/1 |
| 3,995,745 A | 12/1976 | Chambers ...................... 214/1 |
| 4,019,668 A | 4/1977 | Diepeveen ................... 228/3.1 |
| 4,096,953 A | 6/1978 | Kellermann et al. ........... 214/1 |
| 4,155,272 A | 5/1979 | Mosher ........................ 74/479 |
| 4,215,972 A | 8/1980 | Yamasaki et al. ............ 414/742 |
| 4,239,445 A | 12/1980 | Ozawa ........................ 414/749 |
| 4,260,309 A | 4/1981 | Lynn ............................ 414/46 |
| 4,260,319 A | 4/1981 | Motoda et al. ............. 414/591 |

(List continued on next page.)

FOREIGN PATENT DOCUMENTS

JP 3-19781 * 3/1991 .............. B25J/9/06

*Primary Examiner*—Christopher P. Ellis
*Assistant Examiner*—Kenneth W Bower
(74) *Attorney, Agent, or Firm*—Lerner, David, Littenberg, Krumholz & Mentlik, LLP

(57) ABSTRACT

The present invention comprises a material handling device and method for transferring material from one location to another. More specifically, the present invention relates to a device for placing material onto a pallet and/or removing material from a pallet. The device has a pedestal with a working arm pivotally connected to the pedestal. The working arm is driven by a horizontal motion actuator. Connected to the working arm and horizontal motion actuator is a cam follower that is received in a cam track on a cam track plate. The cam track plate can be easily removed and replaced with another plate with the cam tracks in a different arrangement. The horizontal motion actuator moves the cam follower along the cam track, resulting in movement of the working arm along a pre-selected path. At the end of the working arm is a material holder used for grasping and releasing the material to be transferred. The material holder has the ability to move vertically relative to the pedestal, thus allowing material to stacked, or removed from different elevations.

59 Claims, 13 Drawing Sheets

U.S. PATENT DOCUMENTS

| | | | | |
|---|---|---|---|---|
| 4,295,780 | A | 10/1981 | Wada et al. | 414/749 |
| 4,306,464 | A | 12/1981 | Mosher | 74/479 |
| 4,400,984 | A | 8/1983 | Ronbeck | 74/103 |
| 4,432,692 | A | 2/1984 | Breneman | 414/749 |
| 4,451,196 | A | 5/1984 | Harada et al. | 414/733 |
| 4,516,900 | A | 5/1985 | Avey | 414/417 |
| 4,530,637 | A | 7/1985 | Mason et al. | 414/750 |
| 4,585,389 | A | 4/1986 | Watanabe et al. | 414/752 |
| 4,586,868 | A | 5/1986 | Nakashima et al. | 414/735 |
| 4,597,707 | A | 7/1986 | Cornacchia | 414/62 |
| 4,634,338 | A | 1/1987 | Tsuge et al. | 414/752 |
| 4,635,493 | A * | 1/1987 | Buckley | 74/99 |
| 4,641,271 | A | 2/1987 | Konishi et al. | 364/478 |
| 4,666,366 | A | 5/1987 | Davis | 414/749 |
| 4,730,976 | A | 3/1988 | Daviis et al. | 414/749 |
| 4,749,327 | A | 6/1988 | Roda | 414/589 |
| 4,804,306 | A | 2/1989 | Schulte | 414/120 |
| 4,909,701 | A | 3/1990 | Hardegen et al. | 414/749 |
| 4,941,374 | A * | 7/1990 | Focke | 83/13 |
| 4,988,261 | A | 1/1991 | Blatt | 414/749 |
| 4,995,224 | A | 2/1991 | Yourgalite et al. | 53/540 |
| 5,005,335 | A | 4/1991 | Yourgalite et al. | 53/399 |
| 5,074,744 | A | 12/1991 | Mastak | 414/791.7 |
| 5,085,556 | A | 2/1992 | Ohtomi | 414/744.3 |
| 5,094,311 | A | 3/1992 | Akeel | 180/119 |
| 5,108,255 | A | 4/1992 | Cornacchia | 414/792.8 |
| 5,125,639 | A | 6/1992 | Henn | 271/189 |
| 5,147,175 | A | 9/1992 | Tada | 414/749 |
| 5,175,692 | A | 12/1992 | Mazouz et al. | 364/478 |
| 5,180,276 | A | 1/1993 | Hendrickson | 414/752 |
| 5,201,630 | A | 4/1993 | Ishida et al. | 414/744.5 |
| 5,211,528 | A | 5/1993 | Kato | 414/789.6 |
| 5,249,917 | A | 10/1993 | Neumann et al. | 414/799 |
| 5,259,877 | A | 11/1993 | Ozaki | 118/53 |
| 5,320,478 | A | 6/1994 | Gonsowski et al. | 414/792 |
| 5,348,440 | A | 9/1994 | Focke | 414/792.9 |
| 5,391,050 | A | 2/1995 | Gatteschi | 414/796 |
| 5,395,209 | A | 3/1995 | Busse et al. | 414/799 |
| 5,404,817 | A | 4/1995 | Cuff | 101/232 |
| 5,501,571 | A | 3/1996 | Van Durrett et al. | 414/786 |
| 5,525,029 | A | 6/1996 | Taylor | 414/788.1 |
| 5,636,966 | A | 6/1997 | Lyon et al. | 414/791.6 |
| 5,642,980 | A | 7/1997 | Tacchi et al. | 414/796.9 |
| 5,649,804 | A | 7/1997 | Schychuck | 414/751 |
| 5,733,098 | A | 3/1998 | Lyon et al. | 414/786 |
| 5,738,484 | A | 4/1998 | Taylor | 414/788.1 |
| 5,746,566 | A | 5/1998 | Pfarr et al. | 414/751 |
| 5,881,603 | A | 3/1999 | Kitamura | 74/490.03 |
| 6,095,011 | A * | 1/2000 | Brogardh | 74/490.03 |

\* cited by examiner

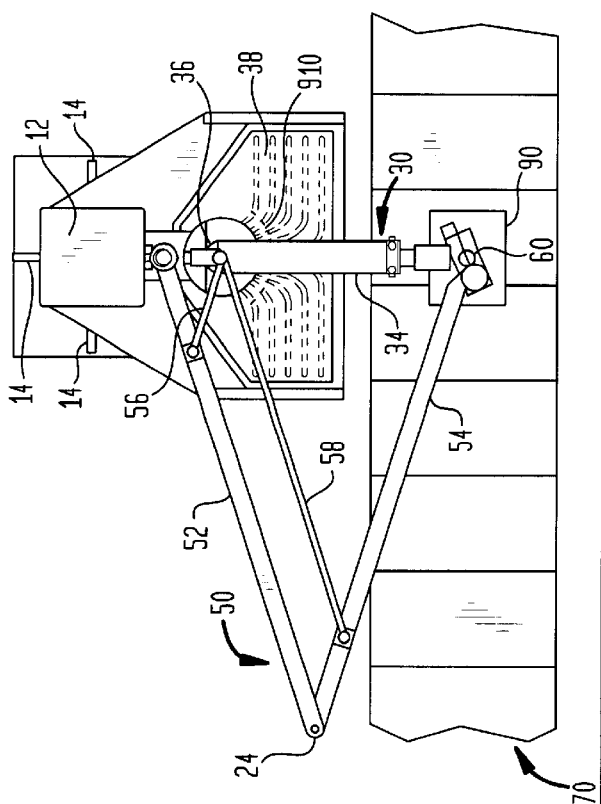
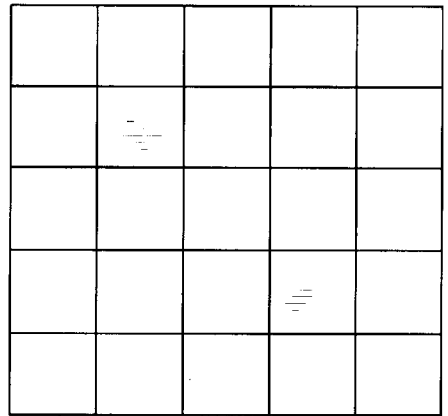
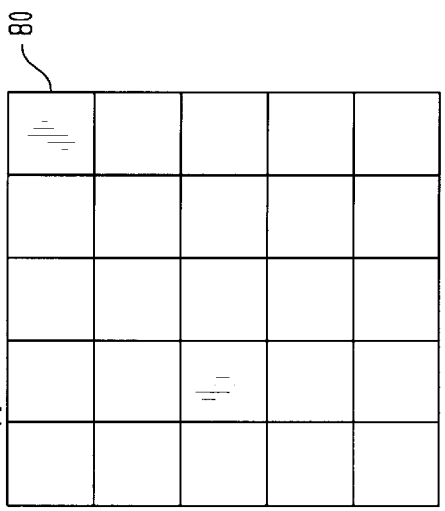
FIG. 3

MATERIAL HANDLING DEVICE

CROSS REFERENCE TO RELATED APPLICATION

This application claims the benefit of provisional patent application Ser. No. 60/137,539 filed on Jun. 4, 1999, the disclosure of which is incorporated by reference.

FIELD OF THE INVENTION

The present invention relates to a device and method for transferring material from one location to another, and in particular to a device for loading a pallet with material from a conveyer and unloading a pallet.

BACKGROUND OF THE INVENTION

At the end of most production lines, the manufactured good or work piece is often packaged in a box or container. If many produced items are to be shipped to the same location, they are often placed on pallets as a means of standardizing material handling. For the purposes of this disclosure, the term "palletizing" includes placing a shipping container onto a pallet and also placing a manufactured good into a shipping container. "Material to be transferred" refers to the items to be moved, such as from the end of the production line to the pallet. In addition, once a pallet is loaded and delivered, it must be unloaded. In this disclosure, "depalletizing" includes removing boxes from the pallet or removing material from a shipping container.

Currently, there are three major types of systems used for palletizing goods from an assembly line or conveyer belt: manually assisted, conventional unitizing, and robotic-based. Each system is useful and cost-effective depending on a number of factors, including: the speed of the assembly line, the complexity of the movement required to place the material onto the pallet or into a box, the flexibility and adaptability of the particular system in conforming to different loading or unloading requirements, and the uniformity of the goods to be placed onto the pallet.

In a manually assisted system, humans transfer the material from the conveyer belt and place it on the pallet. While this system is good for a slow moving conveyer belt, it is not practical for more rapid assembly lines, or if the item is particularly awkward or heavy. Further, repetitive movement injuries may be caused by repeated lifting, compounding the already high cost of labor.

Conventional unitizing systems are fully automated and are designed to handle either low or high line rates. In this method, boxes from the production line are collected to form a single layer to be dropped onto the pallet through the use of a stripper plate. Typically, this system is used with a single pallet.

Finally, robotic-based systems come in two varieties: gantry systems and pedestal systems. Both of these systems usually handle multiple line inputs and are able to load more than one pallet at a time. These systems usually include servo motors and other sensors to be able to change, in mid-line production, the box or container size by the use of controller software. In this way, they are considered "flexible."

The gantry robotic-based system offers a low footprint-to-pallet ratio as most of its components ride along a track above the pallets to be stacked, thus creating more space on the workroom floor. In the pedestal robotic-based system, a loading arm typically sits on a pedestal and is capable of loading multiple pallets around it, or service multiple input lines. Both the robotic system and the conventional unitizing system are capable of great accuracy in placement of the boxes on the pallet. A drawback to the robotic-based gantry and pedestal systems is that as the overall production rate increases, at some point the equipment will be forced to move at very high speeds, becoming impractical, costly and possibly dangerous. It should be noted that both the manual and robotic systems can be employed to unload a pallet as well.

Given these choices, a gap exists for a mid-level producer of goods who does not want to invest the large amount of capital for a robotic-based or other automated system, or is producing at a level unsuitable for manual loading. For this mid-level producer, many of the boxes to be palletized will be of the same size and will be placed in the same location on a daily basis. In this case, there is no need for an expensive robotic-based system or automated system that is flexible or adaptable to varying conditions, or has a high-degree of accuracy. What is needed is a relatively inexpensive material handling device which is simple yet automated to avoid or minimize the need for manual labor, and which does not provide costly features that are extraneous.

With the foregoing in mind, there have been attempts to solve the deficiencies of prior palletizing systems. Of particular note, U.S. Pat. No. 3,995,745, issued to Chambers, discloses a unit for transferring an article from one workstation to another. Referring to FIGS. 1 and 2 thereof, and the specification at column 2, the unit includes a radially reciprocating arm for carrying the work piece at its end. Camming means are provided for reciprocating the arm at selected points in a circular sweeping movement. The camming means includes a cam plate having an endless cam track in the form of a groove. A cam follower is received in the cam track. The cam follower is coupled to the arm and thus rotates with the table and is free to move radially with the arm. The cam plate is stationary with respect to the table. Thus, relative movement between the table and cam plate causes the cam follower to progress along the cam track and thereby move the arm radially. The cam track controls the distance and direction of movement of the arm by way of the cam follower. The Chambers patent does not provide, however, a device that is capable of transferring material to more than one location. Chambers is limited to moving goods from one position to another single position. Thus, what Chambers teaches is not useful for addressing the placement of items in a variety of locations, such as what is required for palletizing.

Also of note is U.S. Pat. No. 4,260,319, issued to Motoda et al. The Motoda patent discloses a simple end position control robot, which isolates the position control apparatus from the weight control apparatus, the two being mechanically associated. Although the Motoda patent does not disclose a cam track per se, the two apparatus are controlled in the XY direction by guide rails. U.S. Pat. No. 4,451,196, issued to Harada et al., discloses a transfer apparatus, including a cam follower for transmitting the swing displacements of the driving arms to the driven arms, a hydraulically controlled actuator for moving the arms, and suction cups for securing the work piece for transfer. U.S. Pat. No. 5,085,556, issued to Ohtomi, discloses a simple industrial robot apparatus comprising an extendable arm for palletizing and depalletizing loads onto or from a pallet. The Ohtomi patent also discloses a robot body or frame on which a vertically moveable arm is movably secured.

The above referenced patents do not provide a simple, economical and yet flexible system capable of palletizing and depalletizing material for a mid-level producer of goods.

Most notably, the above patents describe robotic-systems that provide a level of flexibility that exceeds the need of such a mid-level producer. Thus, a need persists for further improvements in a material handling device.

SUMMARY OF THE INVENTION

In accordance with one aspect of the present invention, there is provided a material handling device which comprises a frame, a plate supported by the frame having at least two cam tracks, a working arm with a first end connected to the frame and a second end remote from the frame, a cam follower coupled to the working arm selectively engageable with each of the at least two cam tracks, a switching element for selectively switching the cam follower into engagement with a selected one of the at least two cam tracks, and an actuator coupled to the working arm for moving the cam follower along the selected one of the two cam tracks, wherein the movement of the cam follower causes movement of the second end of the working arm along a predetermined path corresponding to the selected one of the at least two cam tracks. The cam tracks provided in the plate determine the position of the remote end of the working arm. Thus, once the positions are known where the manufactured items or boxes are to be picked-up or dropped-off, the frame of the material handling device, according to this aspect of the present invention, can be positioned. The cam tracks within the plate are then designed to cause the working arm to travel along a path, determined by the cam tracks, corresponding to the desired loading or unloading points.

In accordance with another aspect of the present invention, the working arm forms part of a pantograph assembly that is coupled to the cam follower. The working arm includes a first member extending from the first end of the working arm and a second member extending from the second end of the working arm. These first and second members are desirably pivotally connected. The pantograph assembly preferably further comprises a first link having a first end pivotally connected to the first member at a position remote from the working arm and a second end pivotally connected to the cam follower. A second link has a first end pivotally connected to the second member at a position remote from the working arm and a second end pivotally connected to the cam follower. The first link desirably is substantially parallel to the second member of the working arm and the second link is substantially parallel to the first member of the working arm. The first and second links are preferably pivotally connected together and to the cam follower. Such pantograph assembly increases the versatility of the material handling device. It allows scaled movement of the working arm so that a relatively small movement of the cam follower along the cam track translates into a larger scaled movement of the working arm. This increases the area in which the material handling device can operate, as it can operate in a wider area without increasing the size of the frame or plate. The present invention takes general advantage of the presumption that most palletizing and de-palletizing will be done with similar sized boxes or manufactured goods over a long period of time without changeover. A further presumption is that there are a limited number of positions in the X-Y plane, parallel to the floor, that a box or item must be placed.

In another aspect of the present invention, the plate is removably supported by the frame and replaceable with plates having different cam track patterns. The removable plate allows replacement plates to be inserted into the material handler allowing different patterns for the working arm to follow. A new plate may be needed if the desired X-Y positioning of the item or box has changed, or if the item or box has changed size. The plates can be changed relatively quickly, thus reducing the down-time of the manufacturing operation. Most preferably, the plate has more than two cam tracks. The plate desirably includes a common area in which the cam tracks communicate. The cam tracks each have a first end communicating with the common area and a second end remote from the common area. The common area is where the cam follower is able to switch from one cam track to another.

In another aspect of the present invention, the switching element comprises a rotary switch plate arranged to engage the cam follower when the cam follower is in the common area. The switching element may also desirably be a linear actuator providing rotary motion. The rotary switch plate may be mechanically driven, electromechanically driven or pneumatically driven.

Preferably, the working arm has a material holder connected to the remote end. The material holder allows the material handling device to grasp and release the material to be transferred. The material holder may comprise a scoop for carrying the material to be transferred. The material holder desirably comprises a vacuum cup for attaching and releasing the material to be transferred. Alternatively, the material holder may include a gripper for grasping and releasing the material to be transferred. The design of the material holder will depend on what the material to be transferred is. If boxes are to be palletized or de-palletized (taken off the pallet), a vacuum cup may be preferred, or a scoop or spatula. However, if a particular manufactured item is to be transferred, a gripper or other grasping device may be desired to pick-up and release the item.

More preferably, the material holder includes a rotary motion actuator for rotating the material holder about a vertical axis of the material to be transferred. The rotary motion actuator may be a linear actuator providing rotary motion or a timing belt connected between a stationary hinge and the material holder. The use of the timing belt maintains the same orientation of the material from the loading to unloading area. A rotary actuator allows the box or item on the material holder to be rotated to a desired orientation for loading or unloading. The material holder desirably comprises a vertical actuator for moving the material holder in a vertical direction. This allows the material holder to grasp and release the material to be transferred at varying heights. Typically, the loading position for the material to be palletized will be on a conveyor belt. Most often, the elevation of the conveyor belt will be different from the stacking height of the pallet. Thus, the material holder preferably is able to adjust for these differences. Further, once a layer has been placed on or removed from the pallet, the stacking height will be different, requiring the material holder to compensate for the new elevation.

Preferably, the material handling device further comprises a programmable controller or a hardwired system for controlling the operation of said material handling device. More preferably, the material handling device further includes a plurality of sensors mounted on the frame and along the predetermined path and the programmable controller receives input information from the plurality of sensors. At least one of the sensors desirably is arranged where the material to be transferred is lifted by the material holder and at least another sensor where the material to be transferred is released by the material holder. As may be required, the programmable controller controls the position and timing of the movement of the actuator, the vertical actuator, the switching element, and/or the rotary motion actuators. The programming feature allows the material handling device to know when and where the material to be transferred is and where it is supposed to end up. A plurality of sensors in intermediate positions along the cam track further defines additional loading or drop off points for the material holder. Also, an embedded controller or microprocessor can be located on the cam track plate containing data on the intermediate positions can be incorporated and read by the controller. The programming feature can determine where to stop the actuators in order to place the working arm in the desired position, as well as control the speed at which the material handling device operates.

In another aspect of the present invention, two or more plates can be connected to the material handling device. The second plate is positioned underneath the first plate and also preferably underneath the actuator as well. The cam follower is able to switch between the plates using a pin actuator. The cam is held in place by a shift slide lock. This added feature allows the user to easily and quickly switch between two patterns of palletizing or de-palletizing by using the pin actuator to switch the cam between the multiple plates. Most preferably, the second plate has more than two cam tracks.

In accordance with another aspect of the present invention, the material handling device comprises a frame; a pantograph track plate supported by the frame and including at least two cam tracks. At least one pantograph assembly is movably connected to the frame and has at least one end receivable within each of the at least two cam tracks. A material holder is also connected to the pantograph assembly with an actuator connected to the material holder. A cam follower is coupled to the pantograph assembly and is receivable within each of the at least two cam tracks for guiding the direction of the material holder during operation. A switching element for switching the cam follower between the cam tracks is also provided. The material holder moves along a path of movement corresponding to the cam track in which the cam follower is positioned. The pantograph assembly increases the operating area of the material handling device. Preferably, the pantograph assembly comprises at least four rigid members pivotably connected to form a parallelogram. More preferably, one of the rigid members is connected to the material holder. One of the rigid members is also desirably connected to the actuator. Relatively small movements of the cam follower along the cam track are translated into relatively large movements by the material holder due to the pantograph assembly. Preferably, the actuator moves the pantograph assembly and thereby moves the cam follower along one of the cam tracks. The actuator is desirably driven by electromechanical means. The actuator may also be driven by hydraulic or pneumatic means.

Preferably, the at least two cam tracks guide the movement of the material holder in a substantially horizontal plane. Also preferably, one of the cam tracks sets predetermined positions for the material holder in a substantially horizontal plane. The pantograph track plate is preferably removably supported by the frame. This provides the ability to easily remove one pantograph track plate and replace it with another plate having a different cam track pattern. The pantograph track plate preferably has more than two cam tracks. The pantograph track plate desirably includes a common area where the at least two cam tracks converge. Each cam track has a first end within the common area and a second end remote from the common area. Preferably, the switching element is a rotary motion actuator. This actuator can be mechanically, electromechanically or pneumatically driven. The switching element is used to move the cam follower within the common area.

The material holder preferably includes a vertical actuator for moving the material holder in the vertical direction. This allows the material holder to grasp and release material to be transferred at varying elevations. Preferably, the material holder comprises a scoop, vacuum cup or gripper depending on the size and shape the material to be transferred. The material holder desirably comprises a rotary motion actuator for orienting the material to be transferred relative to already positioned material. This aids in the alignment and orientation of the material either on the pallet or the box.

The material handling device is preferably operated by a programmable controller. The material handling device preferably also includes a plurality of sensors placed along the cam tracks where the programmable controller receives input from a plurality of sensors. These sensors monitor the position of the cam follower along the cam track and thereby are also monitoring the position of the material holder. Sensors may desirably be laced where the material to be transferred is picked up by the material holder and where the material is to be dropped off. These sensors alert the material handling device to the presence of an item to be transferred and whether the drop off point is clear. As may be required, the programmable controller preferably controls the position and timing of the switching element, the vertical actuator, the rotary motion actuators and/or the horizontal motion actuator. The operation of the material handling device may also be accomplished by using an embedded controller or microprocessor located on the cam track plate. This embedded controller or microprocessor contains information on the shape of the cam tracks and alerts the control system where to stop the cam follower at an intermediate position along the cam track.

A further embodiment of the present invention provides for a method for handling material comprising the step of providing a material handling device comprising a frame; a cam track plate movably supported by the frame, the cam track plate having at least one cam track; a working arm movably connected to the frame and partially received within the at least one cam track; an actuator assembly connected to the frame and the working arm for moving the working arm within the at least one cam track; and a cam follower coupled to the working arm and partially received within the at least one cam track for guiding the working arm within the at least one cam track. The method further comprises the steps of placing a payload to be transferred in a loading position adjacent to the working arm and transferring the payload to be transferred to the working arm. An actuator assembly moves the cam follower along the at least one cam track resulting in the working arm, carrying the material to be transferred, moving to an unloading position. The payload to be transferred is then placed onto the unloading position.

Preferably, a pantograph assembly is connected between the working arm and the cam track plate. The pantograph assembly is movably connected to a stationary point and partially received within at least one cam track. Desirably, the loading position is on a pallet. It is also preferable that the unloading position is on a pallet.

These and other aspects of the present invention will become apparent from a reading of the following disclosure and claims in conjunction with the drawings herein.

BRIEF DESCRIPTION OF THE DRAWINGS

FIG. 3 is a top plan view similar to that of FIG. 2 (also paritally broken away for clarity) in which the material handling device is positioned for loading an article from a conveyor and illustrating a plurality of unloading positions.

DETAILED DESCRIPTION OF THE PREFERRED EMBODIMENTS

Referring to FIGS. 1–12, a material handling device 8, in accordance with a preferred embodiment of the present invention, is shown which includes a base 10 and a pedestal 12 extending up from the base. A frame of reference is indicated in the lower left corne of FIG. 1 and is used throughout this specification. The front direction is used to describe the direction from the material handling device to the area where the material to be transferred is dropped off. For palletizing or depalletizing, this would be a direction from the material handling device to the pallet itself. The up-down direction corresponds to the gravitational frame of reference and is orthogonal to the front-rear direction. The X-Y plane is defined as the plane parallel to the floor on which the material handling device 8 is secured.

Figure 7:
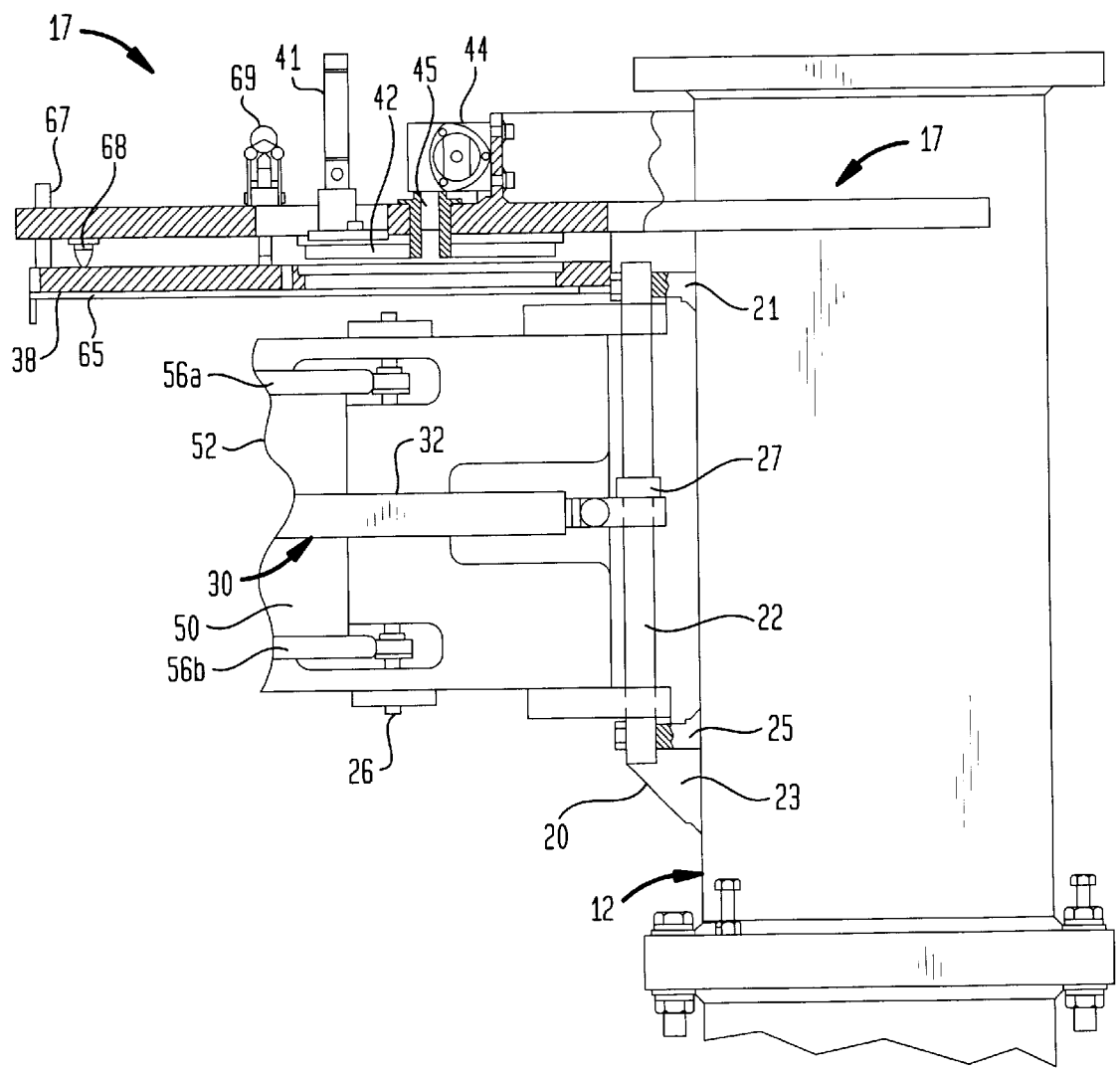
FIG. 7 is an enlarged view of the plate support section of the material handling device of FIG. 6.
Figure 8:
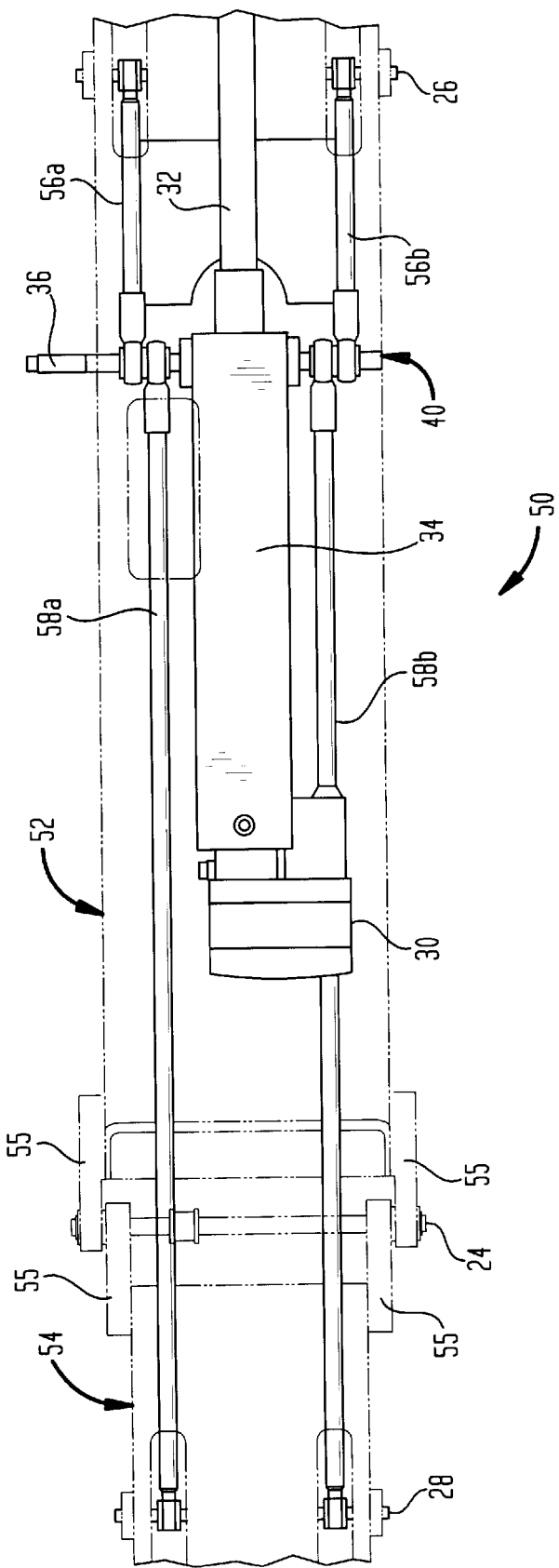
FIG. 8 is an enlarged view of the pantograph assembly of the material handling device of FIG. 6.
Figure 9:
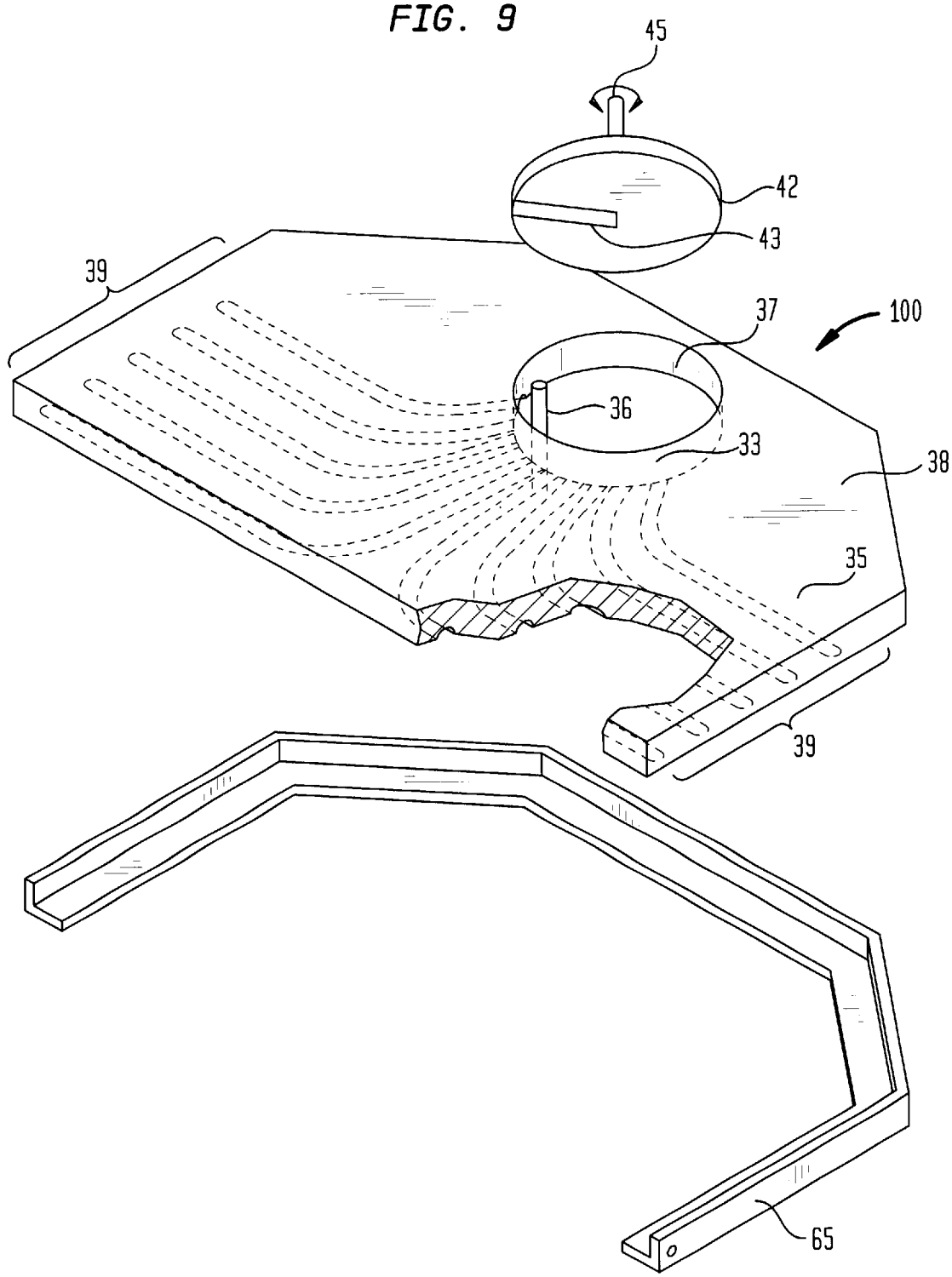
FIG. 9 is a top perspective view of the cam track plate according to one embodiment of the present invention, partially exploded to illustrate the switching element and support structure for the cam plate.

As best seen with reference to FIGS. 6–9, a plate 38 with at least two cam tracks 39 is supported by the pedestal 12. Also secured to the pedestal 12 is a working arm 50 with one end attached to the pedestal 12 and another end remote from the pedestal 12. A cam follower 36 is coupled to the working arm 50 and is selectively engageable with each of the at least two cam tracks 39. The cam tracks 39 are grooves on the underside of the cam track plate 38, as best seen in FIG. 9. The cam follower 36 is selectively switched into engagement with the desired cam tracks by a rotary switch plate 42. An actuator 30 is coupled to the working arm 50 and moves the cam follower 36 along a selected one of the cam tracks 39 provided in the plate 38. The movement of the cam follower 36 along a cam track 39 causes movement of the remote end of the working arm 50 along a predetermined path corresponding to the selected cam track 39. A material holder 60 is also provided and is connected to the remote end of the working arm 50.

Figure 6:
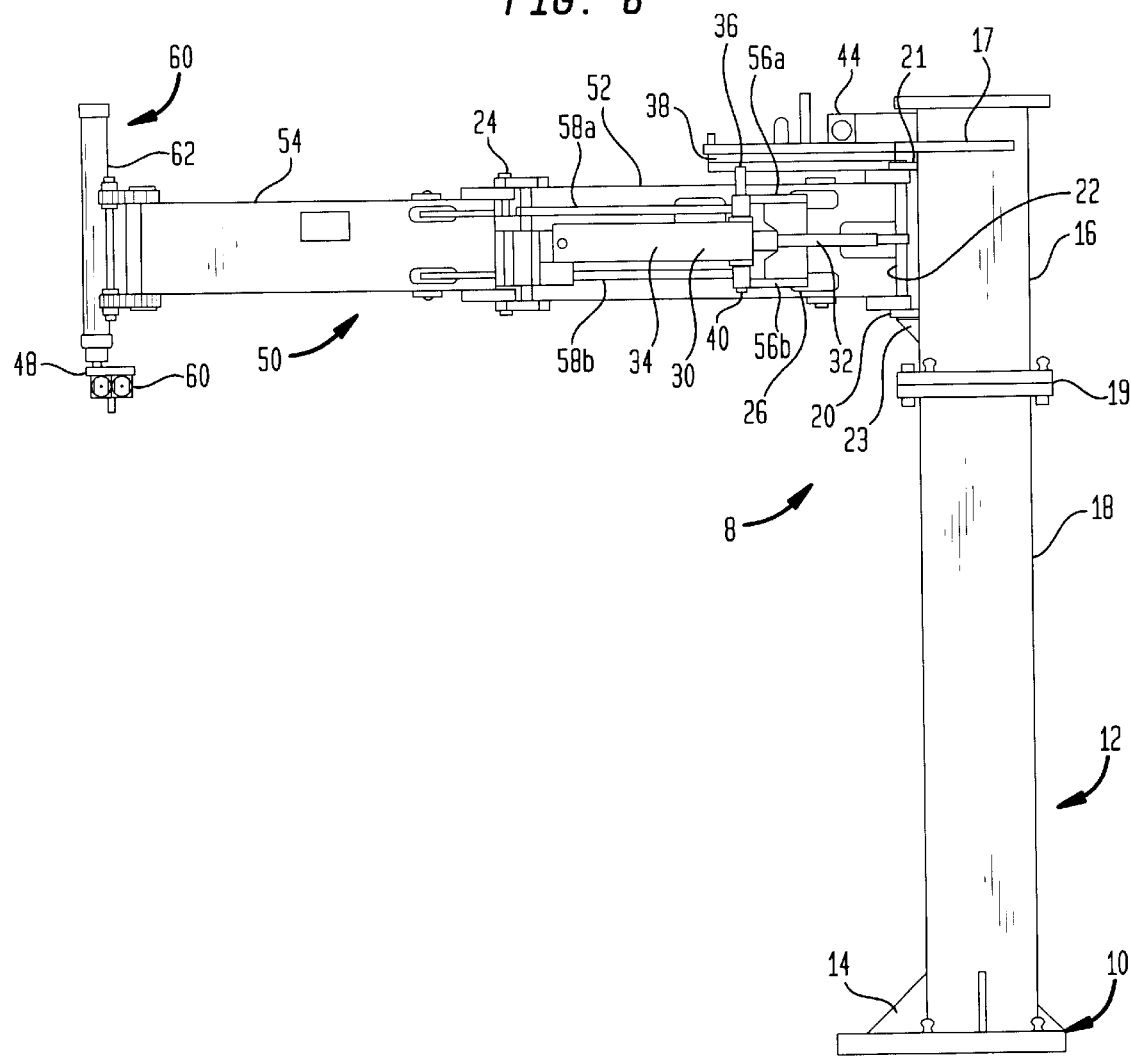
FIG. 6 is a side elevational view of the material handling device of FIG. 1.

As best seen with reference to FIG. 6, the base 10 can be secured to the floor using bolts or other suitable fastening means. The pedestal 12 is attached to the base 10 and also to gussets 14 extending around the pedestal 12. During operation, the material handling device 8 generates torque and rotational inertia that, without the presence of gussets 14, may cause instability. Referring to FIG. 6, the pedestal 12 in the preferred embodiment is separated into at least two sections, defining a top pedestal section 16 and a lower pedestal section 18. The separation of the pedestal 12 into at least two sections is useful when the pedestal is not able to be formed as a single section. Thus, multiple pedestal sections may be formed which are later joined together. These sections may be joined together by aligning flanges 19 formed at the end of both sections. The flanges 19 can be bolted together or secured by other suitable means. This also has the benefit of enabling the height of the pedestal 12 to be easily extended simply by adding an additional intermediate section (not shown) between the flanges 19. This is especially useful if the stacking height of the pallet increases beyond the uppermost position of the material holder 60. The top pedestal section 16 also comprises a plate support section 17 parallel to the floor and projecting in the forward direction.

As best seen in FIG. 7, extending from the front of the pedestal 12 are a lower hinge assembly 20 and an upper hinge assembly 21. The lower hinge assembly 20 has a horizontal ledge 25 extending forwardly from the pedestal 12. The hinge assembly 20 has a vertical hole for receiving the lower end of a hinge pin 22 secured to the working arm 50. The ledge may be reinforced by adding vertical panels 23 extending from pedestal 12 underneath the hinge assembly 20. The upper hinge assembly 21 is second ledge that extends forwardly from the pedestal 12 and includes a vertical hole for receiving the upper end of the hinge pin 22. The pin 22 is constrained from slipping down by a thrust bearing 27 which is secured to the hinge pin 22 above the lower hinge assembly 20 and above where the pin 22 is secured to the working arm 50.

As best seen in FIG. 6, extending from the pedestal 12 is the working arm 50 which comprises a first member 52 pivotally connected to the hinge pin 22 and a second member 54 pivotally connected to the remote end of the first member. The first and second members of the working arm are pivotally connected by means of a working arm pin 24 allowing pivotal movement between the members 52 and 54. The working arm 50 can vary in dimension depending on the size and weight of the material to be palletized and de-palletized. As shown in FIGS. 6 and 7, the working arm members 52 and 54, according to one embodiment of the present invention, are hollow rectangular beams made of steel or other suitable material. This shape provides excellent rigidity without adding to the overall weight of the working arm, thereby decreasing the moments and rotational stresses on the pedestal 12.

In a preferred embodiment, a pantograph assembly is formed by the working arm 50 and a first link 56 and a second link 58 as best shown in FIGS. 2–8. The first link 56 has a first end pivotally connected to the first member 52 of the working arm 50 and a second end pivotally connected to a cam follower 36. The second link 58 has a first end pivotally connected to the second member 54 of the working arm 50 and a second end pivotally connected to the cam follower 36. In this configuration, the first link 56 of the pantograph assembly is substantially parallel to the second member 54 of the working arm and the second link 58 is substantially parallel to the first member 52 of the working arm. Thus, the two links and two members together form a parallelogram, which is the proper structure for a pantograph assembly. The pantograph assembly is used to replicate the movement of the cam follower 36 to the material holder 60 located at the remote end of the working arm, but on a larger scale. The pantograph assembly translates small movements of the cam follower 36 into larger movements of the remote end of the working arm. This allows the material handling device 8 to operate with a much larger working circumference.

As best viewed in FIGS. 6–8, the first link 56 is pivotally connected to a first pantograph pin 26 contained within the first member 52 of the working arm and is pivotally connected to the cam follower 36. The second link 58 also is pivotally connected to the cam follower 36 and extends to the second member 54 of the working arm. As shown in FIG. 8, the first and second members 52 and 54 of the working arm 50 are shown as dashed lines. Preferably, the second link 58 is pivotally connected to a second pantograph pin 28 within the second member 54 of the working arm. In the most preferable embodiment, there are two sets of first links 56 and second links 58 extending from the cam follower 36. One set 56a, 58a extends from the top of the actuator 30, and a corresponding set 56b, 58b extends from the bottom of the actuator, as best viewed in FIG. 6 and 8. Having two sets of first and second links provides additional leverage to the second member 54 working arm allowing for easier movement. Bearing blocks 55 are also provided and are secured to the working arm 50 at the point where the first and second members 52 and 54 are pivotally connected. The blocks provide space to mount low friction bearing (not shown) to aid in the pivot motion of the working arm 50.

Figure 2:
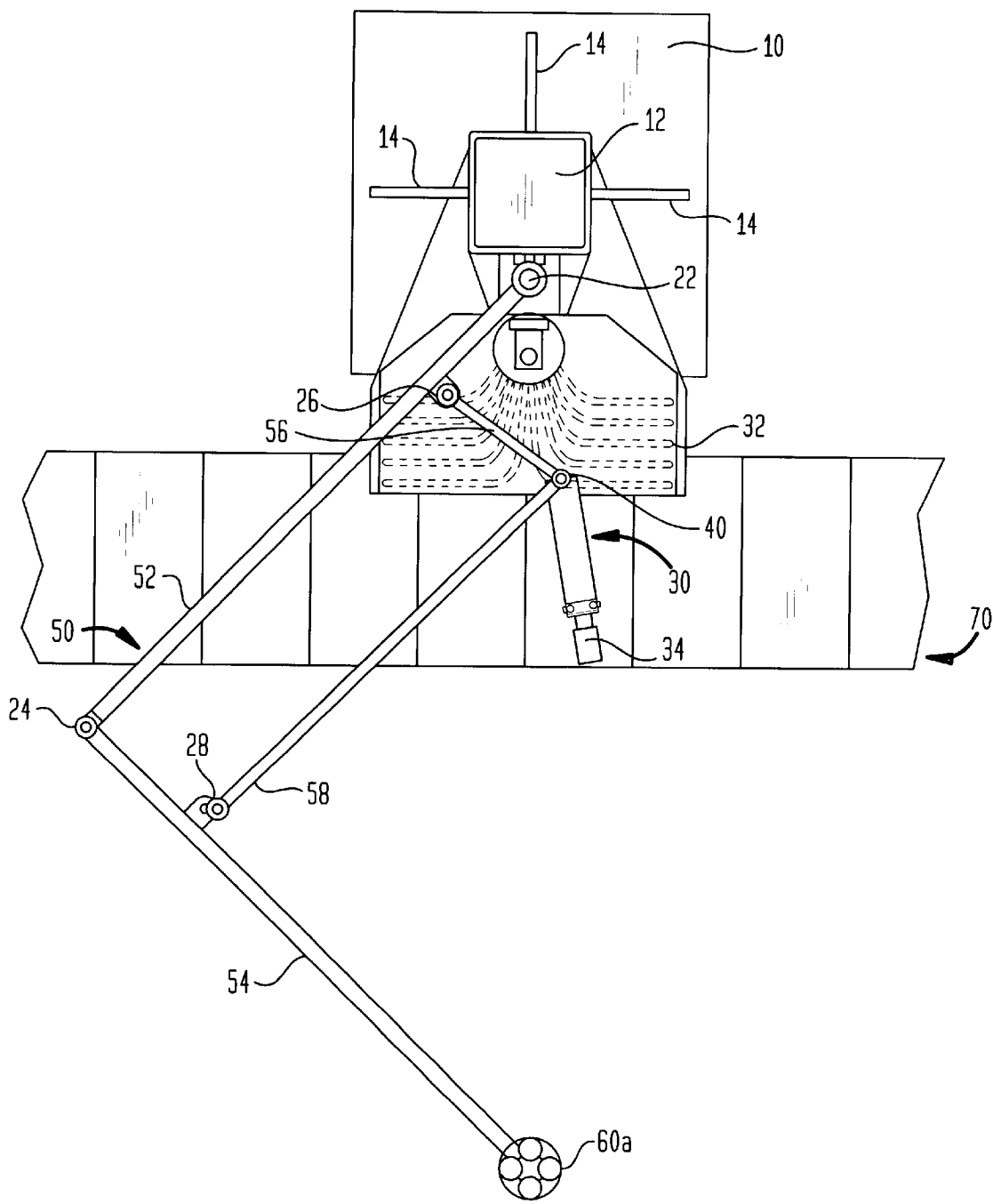
FIG. 2 is a top plan view of the material handling device of FIG. 1, partially broken away for clarity.

The actuator 30 is also connected to the pedestal 12 as best seen in FIGS. 2, 6 and 8. Preferably, the actuator 30 is a pneumatic actuator comprising a stationary rod 32 connected to the working arm pin 22 and a dynamic cylinder 34 which is connected to the cam follower 36 and a pantograph joint 40. The first pantograph joint 40 is where the cam follower 36 is connected to the actuator 30 and where the first and second links 56 and 58 of the pantograph assembly are joined. In this configuration, the dynamic cylinder 34 moves toward and away from the stationary rod 32 horizontally, thus causing the cam follower 36 to move as well as the first and second links 56 and 58 of the first pantograph joint 40 to move. As will be recognized by those skilled in the art, the motion of the actuator can be generated by electromechanical or mechanical means, or any other device to provide the necessary movement.

The cam follower 36 is engaged in a cam track plate 38 and received in the plate support section 17 of the pedestal 12, as best viewed in FIGS. 6–7, and 9. The cam track plate 38 is secured to the plate support section 17 of the pedestal by bolts or other suitable securing means. Preferably, however, the plate support section 17 has an interior shelf 65 in the shape of the cam track plate 38 where the cam track plate can be slid into or out of the head section 17. As best seen in FIG. 7 and 9, the shelf 65 is substantially bottomless and holds the cam track plate 38 along the periphery of the plate. In this embodiment, the plate support section 17 extends in the forward direction and continues above the shelf 65 and the plate 38. The cam track plate can be secured into the pedestal with minimal equipment or expenditure of time. Preferably, the shelf 65 is movably fastened to the plate support 17 so that the shelf can be raised and lowered. In the lowered position as shown in FIGS. 6–7, the plate 38 can be easily removed from the shelf 65 by sliding the plate forwardly. When raised, the plate 38 is secured to the plate support 17. With this preferred configuration, the cam track plate 38 can be easily removed and replaced by a cam track plate of a different configuration, corresponding to a different set of X-Y coordinates, as more full explained below.

To ensure that the plate 38 remains in place during operation of the material handling device 8, guide pins 68 are provided as best seen in FIG. 7. While only one pin 68 is shown in FIG. 7, multiple pins can be located along the periphery of the plate support 17. These guide pins 68 are secured to the plate support section 17 and pass through holes (not shown) in the plate 38. The guide pin aids in properly positioning the plate 38 when the plate is raised and lowered. Along with the guide pin 68, a pin 67 is attached to the plate support 17 and ensures vertical movement when the plate 38 is raised and lowered. Also, a toggle clamp 69 is mounted to the support section 17. This is used to raise the shelf 65 and plate 38 into position for operation of the material handling device 8 and to lower the shelf and plate for replacement of the plate.

As shown in FIG. 9, the cam track plate 38 has within it a number of cam tracks 39 wherein the cam follower 36 may travel. Ten cam tracks 39 are shown in FIG. 9. These cam tracks can vary in number, shape and length depending on the particular requirements of the material handling device, as explained below. As shown in FIG. 9, the cam tracks 39 are grooves on the underside of the plate 38. Also within the cam track plate 38 is a common area 37 where the cam tracks 39 communicate. The cam tracks 39 have a first end 33 communicating with the common area 37 and a second end 35 remote from the common area. As shown in FIG. 9, the common area 37 is a hole that goes through the entire plate 38. The common area 37 is where the cam follower 36 may switch between different cam tracks 39. In the embodiment shown in FIG. 9, a rotary switch plate 42 is provided to guide the cam follower 36 from one cam track to another. The rotary switch plate is a disc-like member having a groove 43 extending from the center of the plate outward. The groove 43 aligns itself with the cam tracks 39, so that the cam follower 36 moves from the common area 37 to the desired cam track 39. Rotation of the switch plate acts to guide the cam follower 36 to the preselected cam track. When the cam follower 36 is in this "home" position in the common area the tip of the cam follower is engaged with the groove 43, and the groove 43 can push the cam follower 36 to the desired cam track 39. Also, the "home" position may correspond to the center of the common area 37 so that the rotary switch plate 42 can spin without pushing the cam follower 36, as the cam follower is engaged with the groove 43. A vertical air cylinder 41 is provided and acts to retract a locating pin (not shown) during the rotation of the switch plate 42. This locating pin engages holes (not shown) around the periphery of the switch plate and is used to maintain the orientation of the switch plate and for precise alignment of the groove 43 with various cam tracks 39.

As best shown in FIGS. 7 and 9, the rotary switch plate 42 is positioned on the opposite side of the cam track plate 38 from the cam follower 36, allowing the cam follower to move along the cam tracks 39 without interference from the switch plate 42 mechanism. The rotary switch plate 42 has a shaft 45 that extends through the plate support section 17 of the pedestal to a first rotary motion actuator 44 that drives the switch plate. The first rotary motion actuator may be electromechanically, pneumatic or mechanically driven. A locking mechanism may be employed where each cam track 39, communicates with the common area 37, as it is indexed. For example, engaging the first rotary motion actuator 44 for a certain period of time will push the cam follower 36 to a desired cam track 39. The control system, as described below, determines how long the first rotary motion actuator 44 is engaged. Precise alignment is achieved by the locating pin (not shown) driven by the vertical air cylinder 41. As depicted in FIG. 7, the rotary actuator 44 is a pneumatic actuator, however, it will be appreciated by those skilled in the art that other types of devices can generate the necessary rotary movement of the switch plate 42. For example, a stepper motor or ratchet drive could be used in place of a pneumatic rotary actuator.

Figure 1:
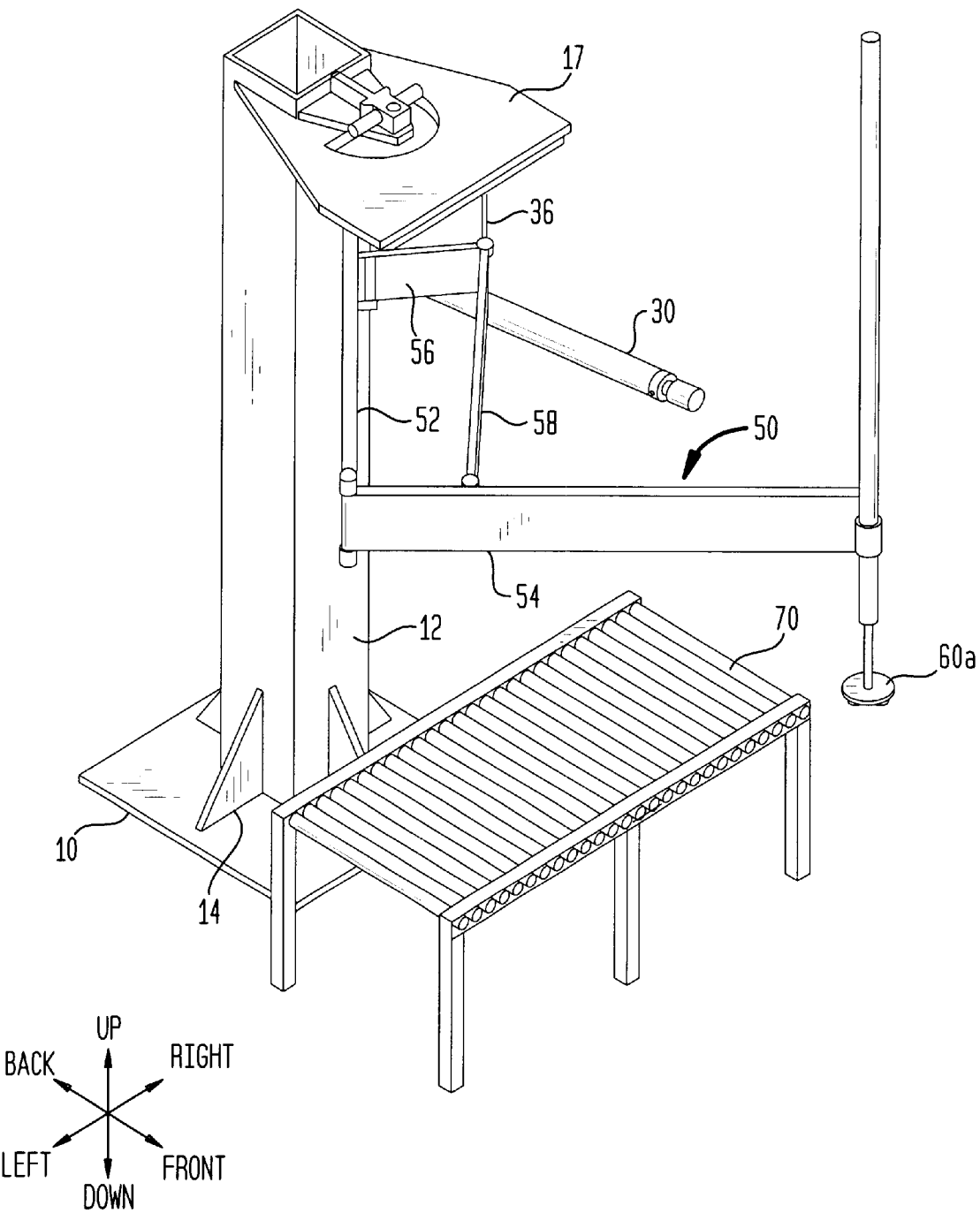
FIG. 1 is a front perspective view of one embodiment of the present invention.
Figure 12:
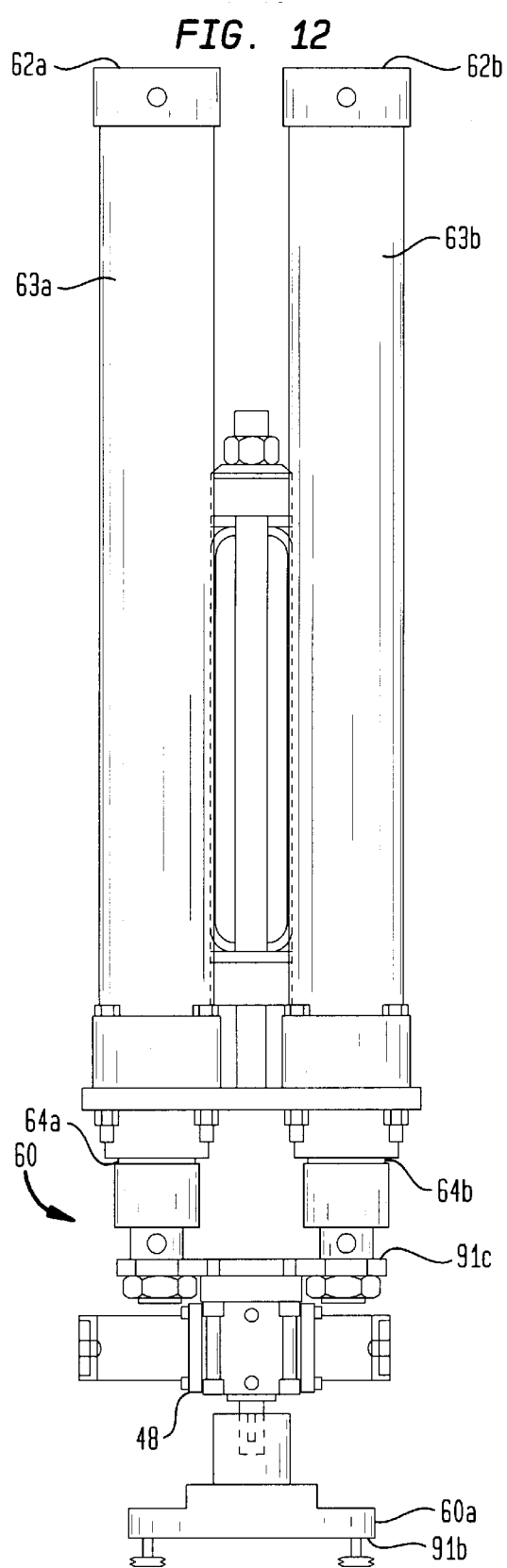
FIG. 12 is an enlarged side elevational view of the material holder of FIG. 11.

The material holder 60 is preferably connected to the remote end of the second member 54 of the working arm 50. The material holder 60 is the device that actually holds or grips the material to be transferred. Depending on what is to be transferred, the material holder 60 can assume a variety of designs. By way of example, if the materials to be transferred are regular sized boxes, a simple scoop or spatula can be used. A vacuum cup would also be useful if the item has a flat section. For irregular items, a gripping device could be implemented. As shown in FIGS. 1–2, and 12, the material holder 60a is a vacuum cup device.

Figure 11:
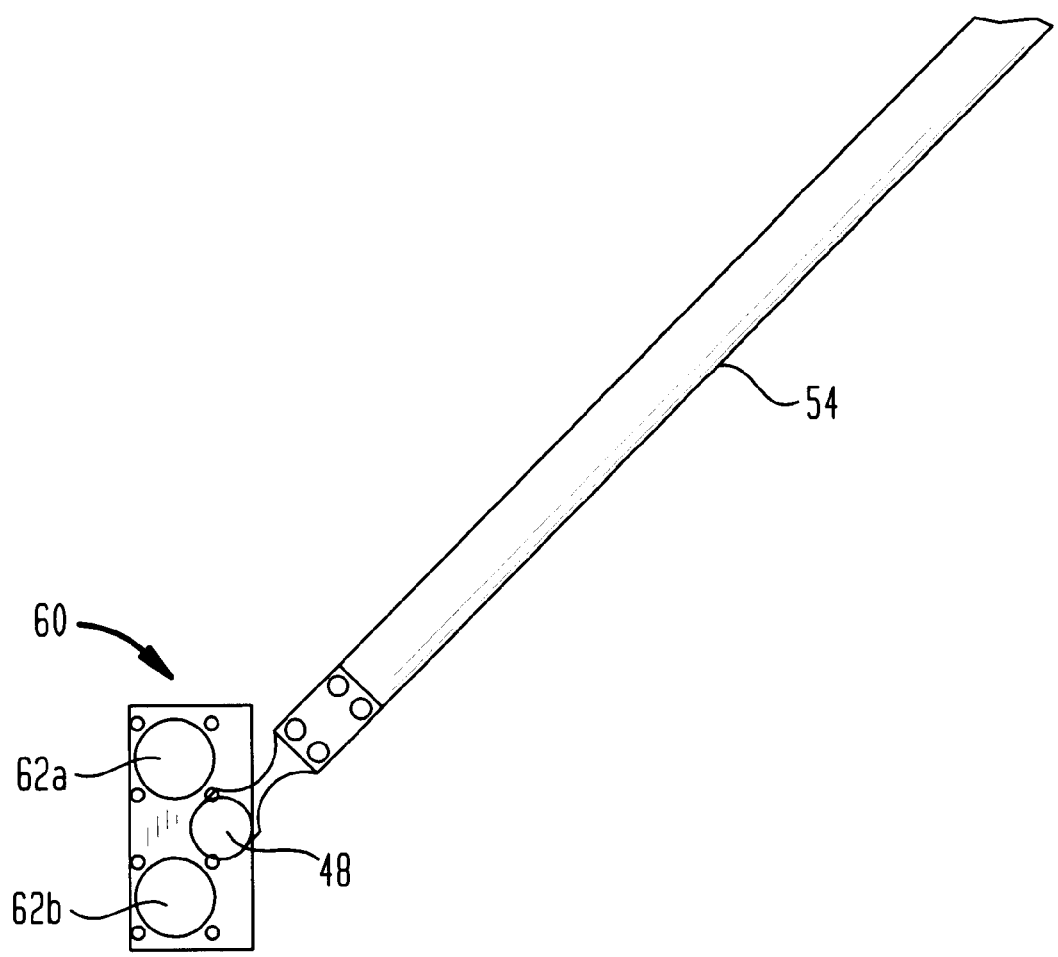
FIG. 11 is an enlarged top plan view of the material holder at the remote end of the working arm of the material handling device of FIG. 6.

As best seen in FIGS. 11 and 12, along with the material holder 60 at the end of the working arm 50, a second rotary motion actuator 48 is connected to the material holder 60 at the remote end of the working arm 50. This second rotary motion actuator 48 is located above the material holder 60 and allows the material to be transferred the ability to rotate into the proper orientation for palletizing or de-palletizing. For example, it may be desired to rotate the material to be transferred 90° from where it was picked up. Preferably, a timing belt (not shown) is employed and is connected between the pedestal 12 and the material holder 60. This keeps the material to be transferred in the same orientation from its pick-up location to its drop-off location. Also, a vertical actuator 62 is provided to the material holder 60. This vertical actuator 62, best seen in FIG. 6, allows the material holder 60 movement in the up-down direction and is especially helpful when the loading point and unloading points are at different elevations, as explained in more detail below.

As shown in FIGS. 11 and 12, two vertical actuators 62 may be provided if the material to be transferred is too heavy for one vertical actuator. Preferably, these vertical actuators 62a and 62b are telescoping cylinders comprising an outer cylinders 63a and 63b and an inner cylinder 64a and 64b. The inner cylinders 64 may be coupled to the second rotary motion actuator 48.

In operation, the material handling device 8 according to one embodiment of the present invention is able to pick-up material in one location and transfer the material to another location with ease and without overly sophisticated robotics. Initially, the material handling device 8 must be positioned on the working floor in a location where the material to be transferred is to be loaded or unloaded (the loading point) and is to be placed (the unloading point), all within the working circumference of the material handling device. This circumference is the area where the material holder 60 can reach. This will depend on the size and weight of the material to be transferred, and thus how long the members of the working arm 52 and 54 can safely extend.

Figure 4:
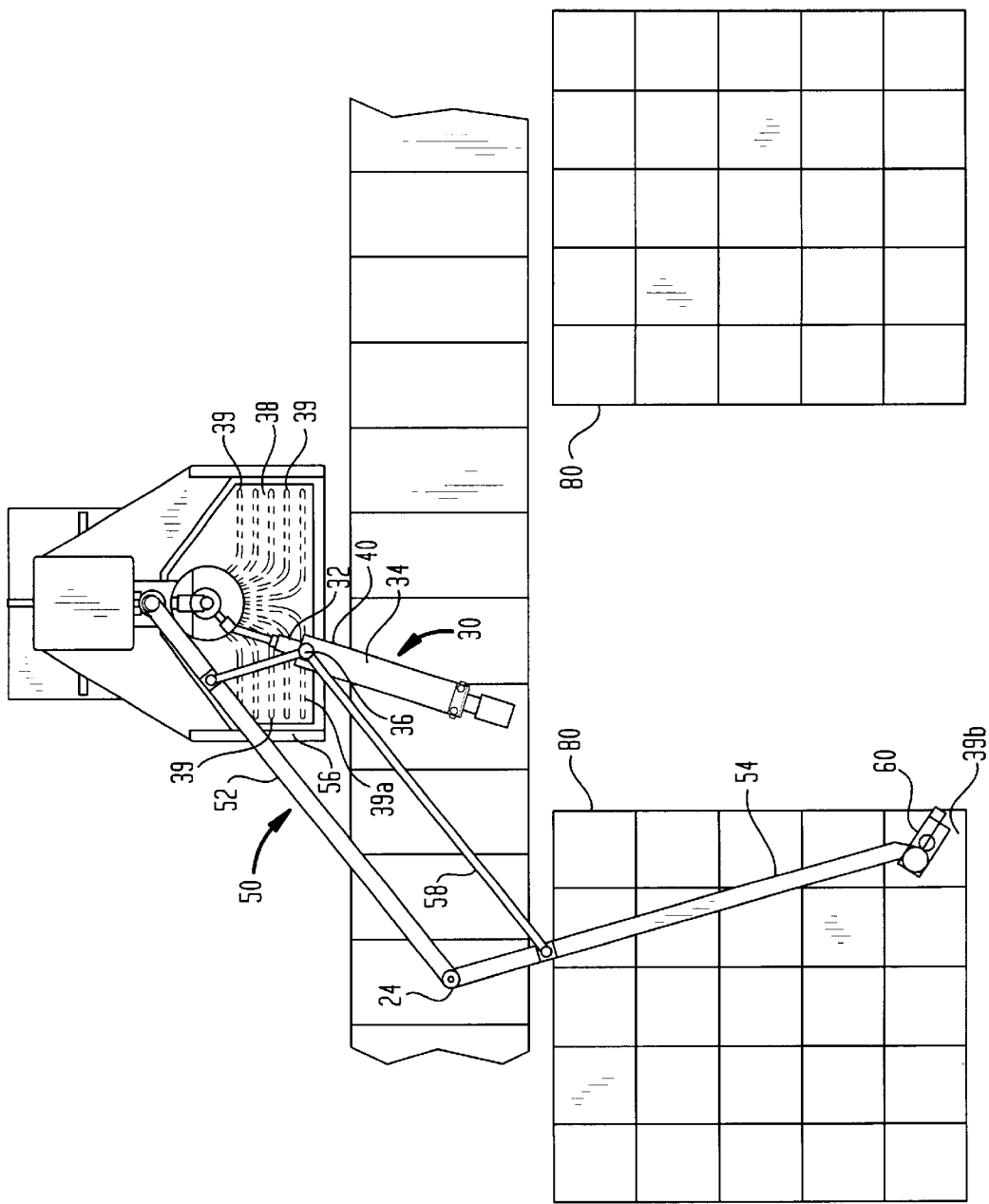
FIG. 4 is a top plan view similar to that of FIG. 3 in which the material handling device of FIG. 1 is positioned to unload an article at its desired location on the X-Y plane.
Figure 5:
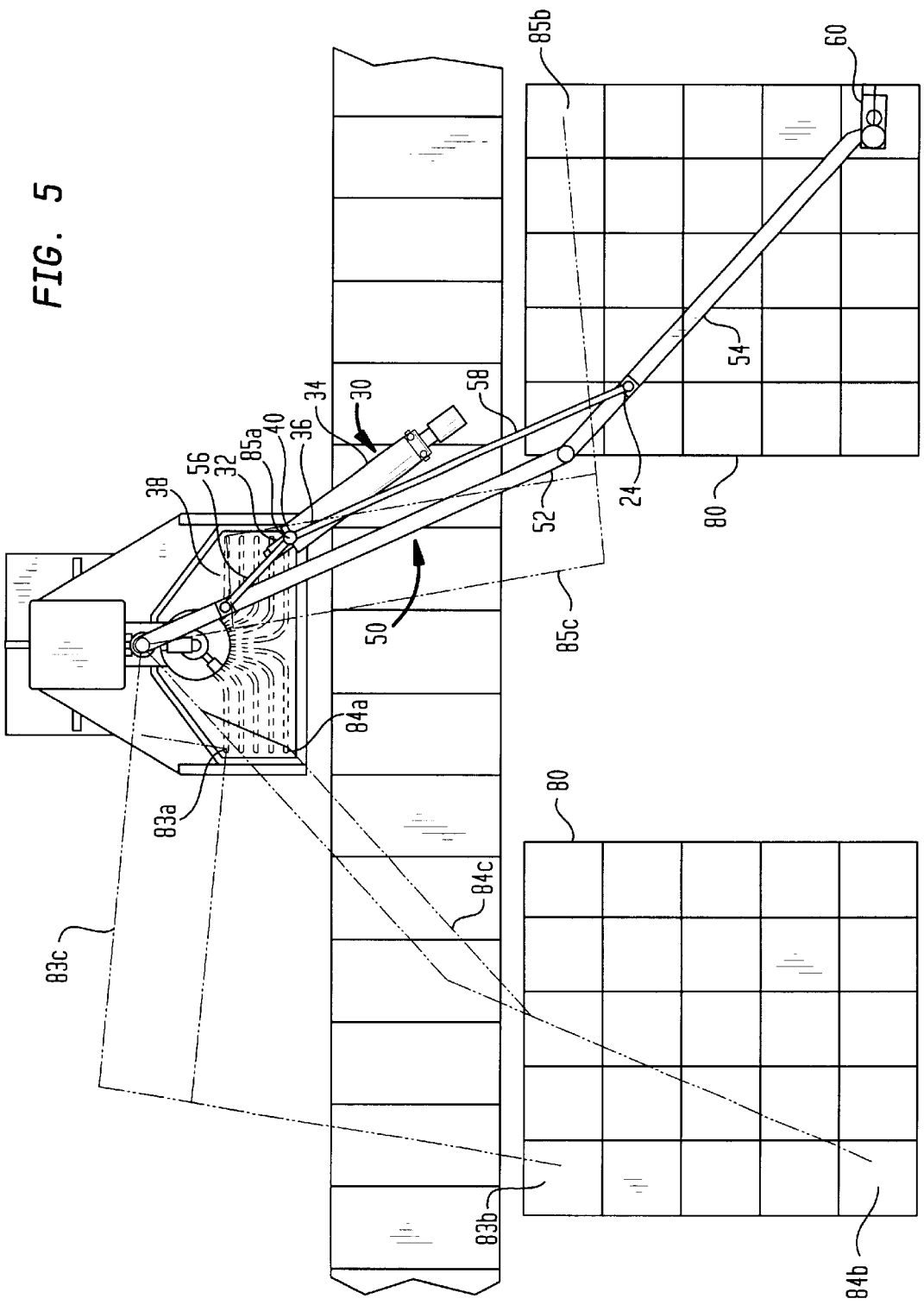
FIG. 5 is another top plan view similar to that of FIG. 3 in which of the material handling device of FIG. 1 is positioned to unload an article at another desired location.

As seen in FIGS. 3–5, various pallet locations 80 are shown that are within the operating circumference of the working arm. In this regard, FIGS. 3–5 have been partially broken away in order to illustrate more clearly the cam plate 38, actuator 30, and pantograph assembly 52, 54, 56, 58. As best seen in FIG. 5, X-Y positions 83, 84 and 85, all defining the range of the operating circumference, are achieved with the diagrammed positions of the cam follower 36, working arm 50 and pantograph assembly. Specifically, if the material to be transferred is intended for position 83b, the cam follower 36 would be in position 83a, and the pantograph assembly will move into the position 83c. This would cause the material holder 60 to be positioned over the location 83b on the pallet. The same is true for positions 84b and 85b, which correspond to the cam follower 36 in position 84a and 85a and pantograph assembly position 84c and 85c respectively.

Once the working circumference of the material handling device 8 is established, and the type of material holder 60 selected, as discussed above, a cam track plate 38 design must be created. The design of the cam track plate 38 depends on the geometry (X-Y coordinates) of the loading and drop off locations. As shown in FIGS. 3–5, the layout of the cam tracks 39 in the cam track plate 38 determine the path the material holder 60 follows. Once the loading and unloading locations are established, a cam track plate 38 design can be created that will correspond to those locations. FIGS. 3–5 demonstrate various loading or unloading points 80 associated with the cam track design on the cam track plate 38. In those figures, the plate 38 comprises ten cam tracks, five on the right side of the plate and five on the left. Each of the cam tracks 39 correspond to a row to be stacked on the pallet. For example, as shown in FIG. 5, the cam follower 36 is in the forward most cam track corresponding to the forward-most row on the pallet 80.

If differing X-Y configurations are needed (i.e. varying sized boxes or pallets), another cam track plate 38 can be designed and inserted into the plate support section 17 of the pedestal, resulting in a different layout of loading or unloading locations. This allows the material handling device 8 a great deal of versatility and allows for adaptations in production without replacement of major, expensive components.

In operation, as seen in FIG. 3, the cam follower 36 is in the "home" position in the common area 37 of the cam track plate 38. Desirably, this home position would correspond to a position where the material holder 60 would be over the conveyer belt 70 where, in palletizing mode, the material holder 60 would be in a position to pick up the material to be transferred. Once the desired cam track 39 is selected, the rotary motion actuator 44 spins the rotary switch plate 42, thereby positioning the groove 43 so that the cam follower 36 will travel along the desired track. Now, as shown in FIG. 4, the horizontal motion actuator 30 moves the cam follower 36 along a cam track 39a until the material holder 60 is in the desired X-Y loading location in de-palletizing mode or unloading location 39b in palletizing mode.

The material holder 60 is moved via the working arm 50 that is in turn connected to the pantograph assembly. The pantograph assembly translates the relatively small-scale movements of the cam follower 36 into relatively large-scale movements of the working arm 50 and consequently the material holder 60. Once the material holder 60 is in the desired location (either loading or unloading), the vertical actuator 62 moves the material holder 60 down to the level of the material to be transferred and either grasps or releases that material.

The material handling device in the palletizing mode would pick up the material to be transferred from a conveyer belt 70 and move it to a location on a pallet 80. If the material to be transferred was a box, a vacuum cup 60a could be used on the material holder to grasp and release the box 90. As best seen in FIG. 3, the material handling device 8, in its loading or home position, is where the material holder 60 is over the box 90 to be picked up on the conveyer belt 70. In this position, the cam follower 36 is in the common area 37 on the cam track plate 38 and the actuator 30 is in its contracted position. Initially, a row on the pallet 80 is selected for placement of boxes 90. Once the row is selected, the first rotary motion actuator 44 engages the switch plate 42 and rotates, aligning the groove 43 with the cam track 39 corresponding to the pre-selected row on the pallet.

Figure 10:
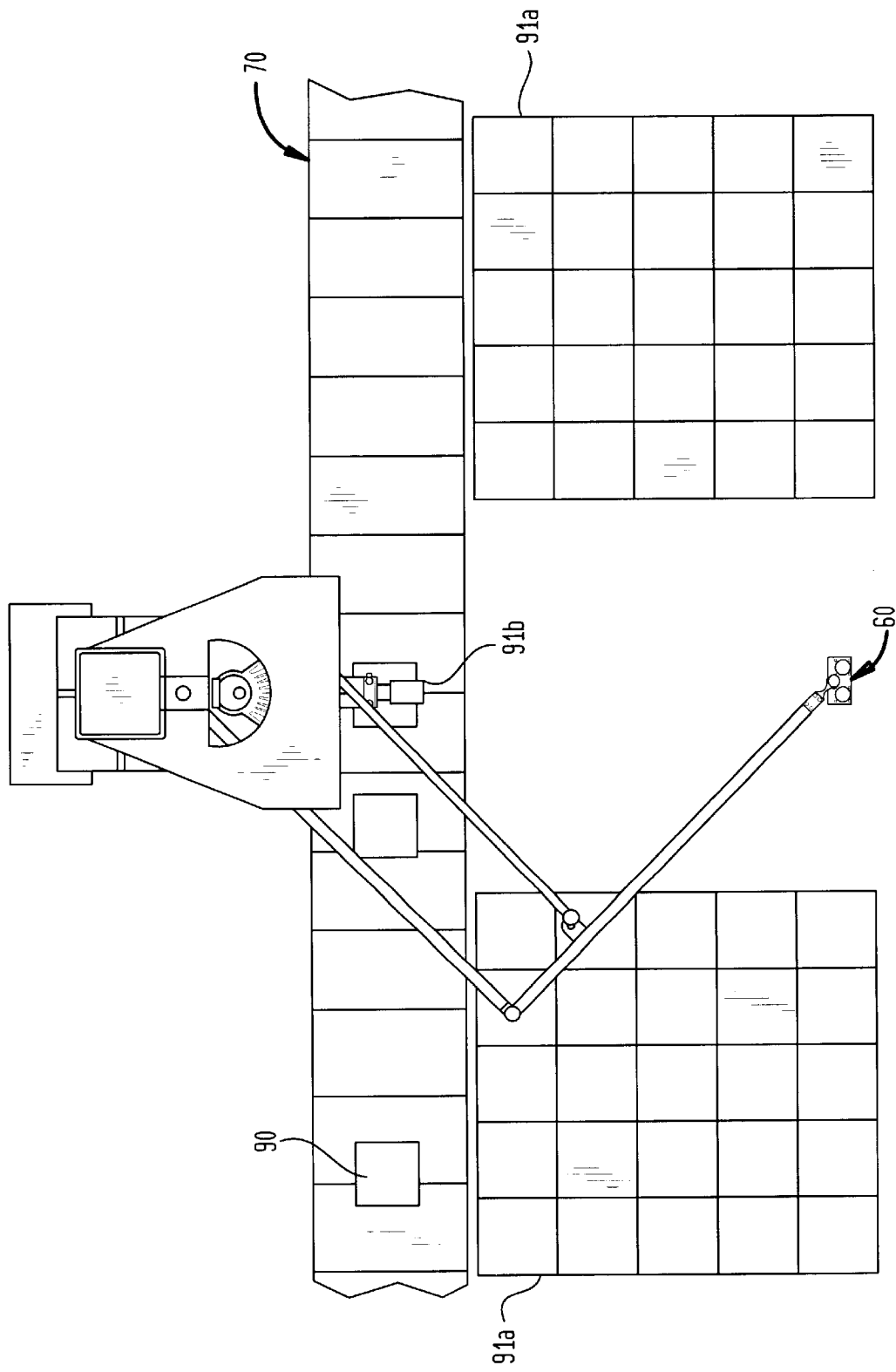
FIG. 10 is a top plan view of the material handling device of FIG. 1 showing the positioning of sensors to aid in the control of the device.

As seen in FIG. 10, sensors 91a are placed on the working floor and indicate that there is a pallet 80 present. Sensors 91b placed on or near the conveyer belt 70 indicate that there is a package 90 in the loading position. The vertical actuator 62 then activates and lowers the material holder 60 until it is in contact with the package 90. Sensors 91d located on end of the material holder, best viewed in FIG. 12, would alert the control system to determine when the contact was made with the box 90 and stop the vertical actuator's movement. Next, the grasping means, either a vacuum cup 60a, scoop, or other suitable means would secure the box 90 to the material holder 60. Once the box 90 was secured, the vertical actuator 62 lifts the box in to its fully retracted position. A sensor 91a alerts the control system that the box 90 has been raised. A second rotary motion actuator 48 may rotate the box into the proper orientation for placement on the pallet 80. Alternatively, a timing belt (not shown) can be used to preserve the orientation of the box from the pick-up point to the drop-off point, as explained above.

Once the box 90 is properly aligned, the horizontal motion actuator 30 would engage and push the cam follower 36, whereby the pantograph links 56 and 58 would move the members of the working arm 52 and 54 and material holder 60 with the box 90 to the unloading point. If the unloading point corresponds to an intermediate position along a cam track 39, sensors (not shown) can be placed either along the cam track or on the unloading position to alert the control system to tell the horizontal motion actuator 30 to stop. Alternatively, a sensor can be placed on the horizontal motion actuator 30 to alert the control system to stop once a certain predetermined distance is reached. Also, an embedded controller or microprocessor (not shown) can be placed on the cam track plate and contain information on the intermediate positions to be read by the controller. The vertical actuator 62 then lowers the box 90 onto the pallet 80. The sensor 91d can be employed to alert the control system when the box reaches the pallet 80. The material holder 60 releases the box 90, and the material handling device reverts to the "home" position where the process is repeated.

Once a row of boxes are on the pallet 80, the first rotary motion actuator 44 would move the rotary switch plate 42 so that the groove 43 would be aligned with the next am track 39 so that the next row of the pallet could be filled. The process is repeated until the pallet or box has been filled.

As layers of boxes are formed on the pallet, the material handling device can adjust the height of the material holder 60, using the vertical actuator 62 to compensate for the change in height and can continue to operate, thus stacking new boxes on the old layer. Alternatively, the material handling device 8 can be used to de-palletize boxes, by engaging the above steps in the opposite order.

The control system for the material handling device can be any programmable computer with the above sensors as inputs and outputs controlling the various actuators and other moving parts. Preferably, the control system operates the material handling device 8 in a sequence described above, however, other sequences may be used to palletize or de-palletize material. The sensors 91a–91d are used to determine the present position of the pallet 80, the position of the working arm 50 and thereby the material holder 60, the position of the cam follower 36 and to determine if the material is in the pick-up location. This control system can also be hardwired if the same loading and unloading patterns are used repeatedly.

In accordance with a further aspect of the present invention, the material handling device may be provided with two cam track plates. More particularly, in this embodiment, a second cam track plate (not shown) extends from the pedestal and is positioned below the horizontal actuator. The cam follower which is coupled to the horizontal actuator, in this aspect, extends upward as well as downward where it can engage the second track plate using a pin actuator or other suitable means. This provides the additional benefit of enabling the material handling device to quickly switch between two plate configurations without having to remove one plate and replace it with another.

Figure 13:
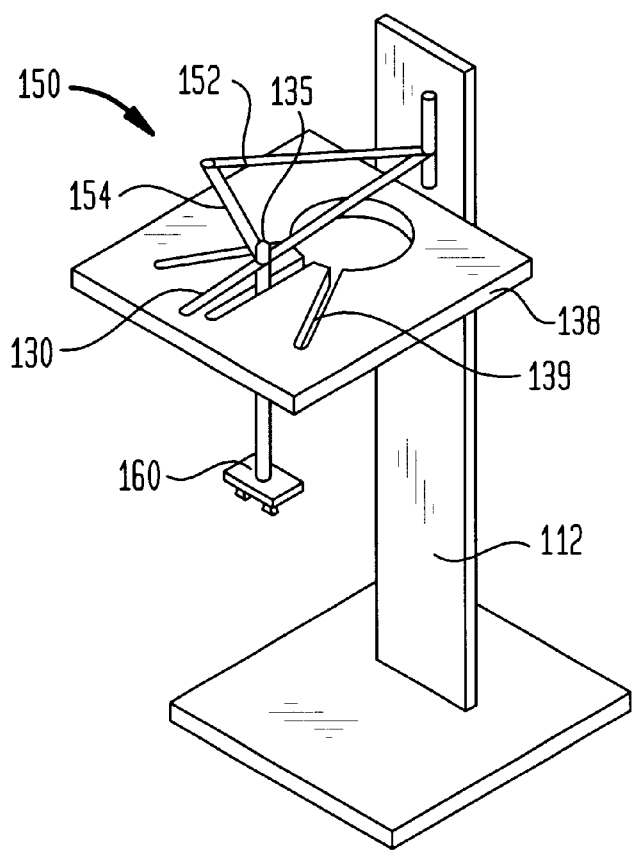
FIG. 13 is a front perspective view of a material handling device according to another embodiment of the present invention.
Figure 14:
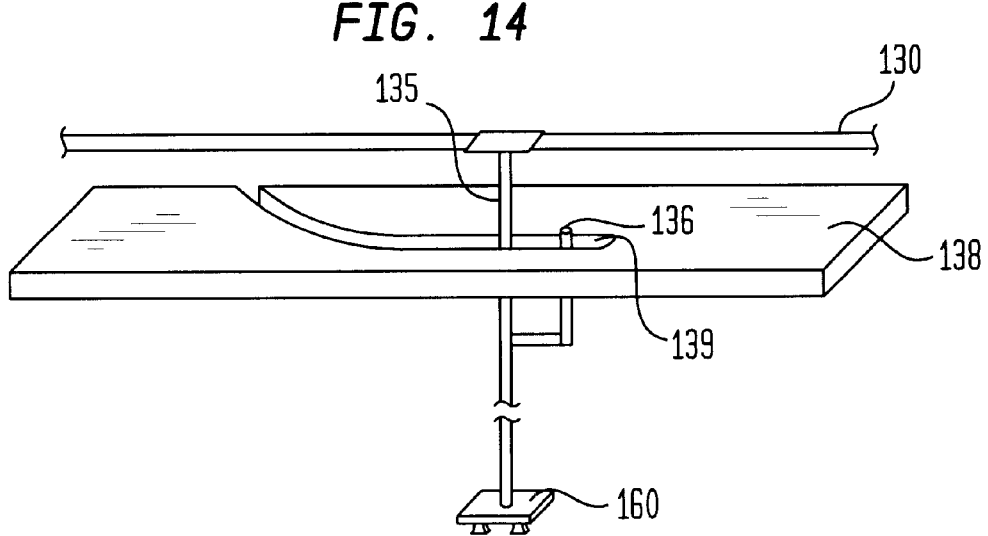
FIG. 14 is a perspective view of the cam plate of the material handling device of FIG. 13.

In yet another embodiment of the present invention, as shown in FIG. 13 and 14, the material handler may not be equipped with a pantograph assembly, but can be used as a simple, direct way to transfer material. This particular embodiment is especially useful in filling boxes on a pallet with small manufactured items. In this embodiment, a pedestal 112 connected to the floor as seen in FIG. 13. Connected to the pedestal is a working arm 150 comprising one or more members 152 and 154 pivotally connected to each other. At the remote end of the working arm, a material holder 160 is connected. A horizontal motion actuator 130 is also provided and is connected to the pedestal 112 and the remote end of the working arm 150. A vertical actuator 135 and cam follower 136 are also coupled to the remote end of the working arm 150 and are likewise attached to the material holder 160, as best seen in FIG. 14. The vertical actuator 135 and cam follower 136 are received in a cam track plate 138 that comprises a number of cam tracks 139.

The cam track plate 138 and cam tracks 139 work in the same way as the first embodiment described above. The horizontal motion actuator 130 moves the remote end of the working arm 150, in turn moving the vertical actuator 135 and cam follower 136 along the pre-selected cam track 139. A common area, switch plate and rotary motion actuator are also provided and function in the same way as the first embodiment. The material holder 160 at the end of the working arm 150 has the capability of grasping and releasing material to be transferred, similar to the first embodiment.

Thus, it will be appreciated by those skilled in the art that a material handling device 8 comprises a pedestal 12, a plate 38 supported by the pedestal 12 where the plate has at least two cam tracks 39. The material handling device 8 further includes a working arm 50 having a first end connected to the pedestal 12 and a second end remote from the pedestal. A cam follower 36 is also included and is coupled to the working arm 50 and is selectively engageable with each of the cam tracks 39. An actuator 30 is coupled to the working arm 50 and moves the cam follower 36 along one of the cam tracks 39 and the movement of the cam follower 36 along one of the cam tracks 39 causes movement of the second end of the working arm 50 along a predetermined path corresponding to the selected cam track 39.

As will be appreciated, numerous variations and combinations of the features discussed above may be utilized without departing from the present invention as further defined by the claims. Accordingly, the foregoing description of the preferred embodiments should be taken by way of illustration rather than by way of limitation of the invention.

What is claimed is:

1. A material handling device comprising:
   a pedestal;
   a plate supported by said pedestal having at least two cam tracks;
   a working arm having a first end connected to said pedestal and a second end remote from said pedestal;
   a cam follower coupled to said working arm and selectively engageable with each of said at least two cam tracks, and a switching element for selectively switching said cam follower into engagement with a selected one of said at least two cam tracks; and
   an actuator coupled to said working arm for moving said cam follower along said selected one of said at least two cam tracks, wherein movement of said cam follower along said selected one of said at least two cam tracks causes movement of said second end of said working arm along a predetermined path corresponding to said selected one of said at least two cam tracks.

2. The material handling device of claim 1, wherein said working arm forms part of a pantograph assembly coupled to said cam follower, said pantograph assembly including a first member extending from said first end of said working arm and a second member extending from said second end of said working arm, and wherein said first and said second members are each pivotally connected.

3. The material handling device of claim 2, wherein said pantograph assembly further comprises:
   a first link having a first end pivotally connected to said first member at a position remote from said working arm and a second end pivotally connected to said cam follower; and
   a second link having a first end pivotally connected to said second member at a position remote from said working arm and a second end pivotally connected to said cam follower.

4. The material handling device of claim 3, wherein said first link is substantially parallel to said second member of said working arm and said second link is substantially parallel to said first member of said working arm.

5. The material handling device of claim 4, wherein said first link and second link are pivotally connected to each other and to said cam follower.

6. The material handling device of claim 1, wherein said plate is removably supported by said pedestal.

7. The material handling device of claim 1, wherein said plate has more than two cam tracks.

8. The material handling device of claim 1, wherein said plate includes a common area in which said at least two cam tracks communicate, said cam tracks each having a first end communicating with said common area and a second end remote from said common area.

9. The material handling device of claim 8, wherein said switching element comprises a rotary switch plate arranged to engage said cam follower when said cam follower is in said common area.

10. The material handling device of claim 8, wherein said switching element is a linear actuator.

11. The material handling device of claim 9, wherein said rotary switch plate is mechanically driven.

12. The material handling device of claim 9, wherein said rotary switch plate is electromechanically driven.

13. The material handling device of claim 9, wherein said rotary switch plate is pneumatically driven.

14. The material handling device of claim 1, wherein said second end of said working arm includes a material holder for grasping and releasing material to be transferred.

15. The material handling device of claim 14, wherein said material holder comprises a vacuum cup for attaching and releasing the material to be transferred.

16. The material handling device of claim 14, wherein said material holder includes a rotary motion actuator for rotating said material holder about a vertical axis.

17. The material handling device of claim 14, wherein said material holder further comprises a vertical actuator for moving said material holder in a vertical direction.

18. The material handling device of claim 1, further comprising a programmable controller for controlling the operation of said material handling device.

19. The material handling device of claim 18, further including a plurality of sensors mounted to said pedestal and along said cam tracks wherein said controller receives input information from said plurality of sensors.

20. The material handling device of claim 19, wherein at least one of said plurality of sensors is arranged at a location where said material to be transferred is lifted by said material holder and wherein at least one other of said plurality of sensors is arranged at a location where said material to be transferred is released by said material holder.

21. The material handling device of claim 18, wherein said controller controls the position and timing of the movement of said actuator.

22. The material handling device of claim 18, wherein said controller controls the position and timing of the movement of said vertical actuator.

23. The material handling device of claim 18, wherein said controller controls the position and timing of the movement of said switching element.

24. The material handling device of claim 18, wherein said controller controls the position and timing of the movement of said rotary motion actuators.

25. The material handling device of claim 1, wherein said plate comprises a first plate, and said material handling device further includes a second plate attached to said pedestal, and having at least two cam tracks and wherein said cam follower is movable between said first plate and said second plate so as to be engagable.

26. The material handling device of claim 25, wherein said second plate is connected to said pedestal at a position vertically below said first plate and said actuator.

27. The material handling device of claim 26, further including a pin actuator for actuating said cam follower between said first and second plates, and a shift slide lock for restraining said cam follower once engaged in one of said first or second plates.

28. The material handling device of claim 27, wherein said second plate has more than two cam tracks.

29. A material handling device comprising:
   a pedestal;
   a pantograph track plate supported by said pedestal, said pantograph track plate including at least two cam tracks;
   at least one pantograph assembly movably connected to said pedestal and having at least one end of said pantograph assembly receivable within each of said at least two cam tracks;
   a material holder connected to said pantograph assembly;
   an actuator connected to said material holder;

a cam follower coupled to said pantograph assembly and receivable within each of said at least two cam tracks for guiding the direction of said material holder during operation; and a switching element for switching said cam follower between said at least two cam tracks, whereby said material holder moves along a path of movement corresponding to the cam track in which said cam follower is positioned.

30. The material handling device of claim 29, wherein said at least two cam tracks guide the movement of said material holder in a substantially horizontal plane.

31. The material handling device of claim 30, wherein each of said at least two cam tracks define a plurality of predetermined positions for said material holder in a substantially horizontal plane.

32. The material handling device of claim 29, wherein said pantograph track plate is removably supported by said pedestal.

33. The material handling device of claim 29, wherein said pantograph track plate has more than two cam tracks.

34. The material handling device of claim 29, wherein said pantograph track plate further includes a common area in which said at least two cam tracks communicate, said cam tracks each having a first end communicating with said common area and a second end remote from said common area.

35. The material handling device of claim 29, wherein said switching element comprises a first rotary motion actuator arranged to engage said cam follower when said cam follower is in said common area.

36. The material handling device of claim 35, wherein said first rotary motion actuator is mechanically driven.

37. The material handling device of claim 35, wherein said first rotary motion actuator is electromechanically driven.

38. The material handling device of claim 35, wherein said first rotary motion actuator is pneumatically driven.

39. The material handling device of claim 29, wherein said at least one pantograph assembly comprises at least four rigid members pivotably connected to each other to form a parallelogram.

40. The material handling device of claim 39, wherein one of said rigid members is connected to said material holder.

41. The material handling device of claim 39, wherein one of said rigid members is connected to said actuator.

42. The material handling device of claim 29, wherein said material holder includes a vertical actuator for movement of said material holder in a vertical direction.

43. The material handling device of claim 42, wherein said material holder further comprises a vacuum cup for attaching and releasing material to be transferred.

44. The material handling device of claim 29, wherein said mate rial holder is capable of rotation about a vertical axis for orienting the material to be transferred relative to other material to be transferred.

45. The material handling device of claim 44, further including a second rotary motion actuator for rotating said material holder about said vertical axis.

46. The material handling device of claim 29, wherein said horizontal motion actuator actuates said pantograph assembly to provide movement of said cam follower and pantograph assembly along a selected one of said at least two cam tracks.

47. The material handling device of claim 46, wherein said actuator is driven by a pneumatic air cylinder.

48. The material handling device of claim 29, further comprising a programmable controller for controlling the operation of said material handling device.

49. The material handling device of claim 48, further including a plurality of sensors mounted along said at least two cam tracks, wherein said programmable controller receives input information from said plurality of sensors.

50. The material handling device of claim 48, wherein said sensors are at least placed where material to be transferred is lifted by said material holder and where material to be transferred is released by said material holder.

51. The material handling device of claim 50, wherein said programmable controller controls the position and timing of the movement of said switching element.

52. The material handling device of claim 50, wherein said programmable controller controls the position and timing of the movement of said vertical actuator.

53. The material handling device of claim 50, wherein said programmable controller controls the position and timing of the movement of said first and second rotary actuators.

54. The material handling device of claim 50, wherein said programmable controller controls the position and timing of the movement of said actuator.

55. The material handling device of claim 29, further comprising an embedded controller or microprocessor for controlling the operation of said material handling device.

56. A method for handling material comprising the steps of:

providing a material handling device comprising a pedestal; a cam track plate movably supported by said pedestal, said cam track plate having at least one cam track; a working arm movably connected to said pedestal and partially received within said at least one cam track; an actuator assembly connected to said pedestal and said working arm for moving said working arm along a predetermined path; and a cam follower coupled to said working arm and partially received within said at least one cam track for guiding said working arm along said predetermined path within said at least one cam track;

placing a payload to be transferred in a loading position adjacent to said working arm;

transferring said payload to be transferred to said working arm;

actuating said actuator assembly to move said working arm carrying said payload to be transferred from said loading position to an unloading position; and transferring said payload to be transferred on to said unloading position.

57. The method of claim 56, wherein said working arm further includes a pantograph assembly connected to said pedestal and partially received within said at least one cam track and said actuator assembly moves said working arm and said pantograph assembly carrying said payload to be transferred from said loading position to an unloading position.

58. The method of claim 56, wherein said payload to be transferred is placed on a pallet adjacent to the working arm.

59. The method of claim 56, wherein said payload to be transferred is placed onto a pallet.

* * * * *

UNITED STATES PATENT AND TRADEMARK OFFICE
CERTIFICATE OF CORRECTION

PATENT NO.   : 6,394,740 B1
DATED        : May 28, 2002
INVENTOR(S)  : Derby et al.

It is certified that error appears in the above-identified patent and that said Letters Patent is hereby corrected as shown below:

Column 17,
Line 54, "mate rial" should read -- material --.

Signed and Sealed this

Nineteenth Day of November, 2002

Attest:

Attesting Officer

JAMES E. ROGAN
Director of the United States Patent and Trademark Office